United States Patent [19]

Parker et al.

[11] Patent Number: 5,674,338
[45] Date of Patent: Oct. 7, 1997

[54] METHOD OF JOINING WOOD

[75] Inventors: Jeffery R. Parker, Ngongotaha; Jeremy B. M. Taylor; David V. Plackett, both of Rotorua; Terence D. Lomax, Mamaku, all of New Zealand

[73] Assignee: Her Majesty The Queen In Right Of New Zealand/Secretary of Forestry, Wellington, New Zealand

[21] Appl. No.: 254,431

[22] Filed: Jun. 6, 1994

Related U.S. Application Data

[63] Continuation of Ser. No. 811,704, Dec. 20, 1991, abandoned.

[30] Foreign Application Priority Data

Dec. 21, 1990 [NZ] New Zealand .................... 236646

[51] Int. Cl.$^6$ .................................... B32B 35/00
[52] U.S. Cl. ................. 156/98; 144/347; 144/348; 144/352; 156/304.5; 156/310; 156/314; 156/331.3; 156/335; 428/58; 428/528
[58] Field of Search .................... 156/331.3, 304.5, 156/314, 335, 98, 310; 144/347, 348, 352; 428/58, 528

[56] References Cited

U.S. PATENT DOCUMENTS

| | | | |
|---|---|---|---|
| 2,443,197 | 6/1948 | Rhodes | 156/310 |
| 2,942,635 | 6/1960 | Horne | |
| 3,802,986 | 4/1974 | Forsythe | 156/304.5 |
| 3,816,236 | 6/1974 | Baymiller | 156/310 |
| 3,985,169 | 10/1976 | Chow | 156/304.5 |
| 4,061,620 | 12/1977 | Gillern | 428/528 |
| 4,824,896 | 4/1989 | Clarke et al. | |
| 4,897,314 | 1/1990 | Clarke et al. | |

FOREIGN PATENT DOCUMENTS 332162  8/1989  Canada.

OTHER PUBLICATIONS

Phenolic Resin Wood Adhesives, Pizzi A., pp. 105 and 125.
Phenolic Resins, Knop A. and Pilato A., 1985, Preface, pp. 34–37.

*Primary Examiner*—John J. Gallagher
*Attorney, Agent, or Firm*—Hovey, Williams, Timmons & Collins

[57] ABSTRACT

The invention comprises a method for joining pieces of unseasoned or undried wood, by finger jointing or other joining technique. The wood may have a moisture content above the fibre saturation point of the wood, and as high as 50% to 100% or higher moisture content. An adhesive having a sufficiently high molecular weight or viscosity to avoid adhesive degradation or migration due to moisture in the wood during forming and curing of the joint, or which will cure to achieve such a sufficiently high molecular weight or viscosity during forming and curing of the joint is employed. Optionally a cure promotor or chemical which increases the rate of cure of the adhesive may be used. Preferred adhesives are formaldehyde based adhesives. Preferred cure promotor or chemicals are ammonia or amine compounds, organic acids including low molecular weight carboxylic acids, and Lewis or Bronsted class acids.

13 Claims, No Drawings

METHOD OF JOINING WOOD

This application is a Continuation of application Ser. No. 07/811,704, filed 20 Dec. 1991, now abandoned.

BACKGROUND OF THE INVENTION

1. Field of the Invention

The present invention comprises a method of joining pieces of wood.

2. Discussion of the Prior Art

Various processes of gluing or adhering together pieces of wood such as lengths of timber to form longer and/or wider lengths of timber, of wood veneers to form plywood and so forth are known.

One type of glued connection which is widely used in the timber processing industry is the finger-joint. This joint is made by a process whereby wedge-shaped fingers are machined into the end of side-grain of the pieces of timber to be joined, adhesives developed for joining timbers are applied to the exposed faces of the fingers, the fingers on any two pieces of wood are mated so that the protruding fingers on one piece of timber will slide into the grooves cut on the other piece, and end pressure is applied so that the wedge-shaped fingers "lock" together. The end pressure will also supply sufficient lateral pressure to the adhesive between the sloping faces of the fingers that the adhesive will satisfactorily bond the two pieces of timber together with sufficient strength and reliability that the resulting piece will be usable in load bearing situations. Finger-jointing is widely used to produce longer, finger-jointed lengths of good quality timber from wood having an unacceptably high number of defects.

In the production of conventionally finger-jointed timber the lengths of timber are sawn from the log, kiln dried or air dried, and then sections containing defects such as knots etc., are cut from the lengths of timber and discarded leaving short lengths of high grade by timber. These lengths of high grade timber are then finger-jointed to produce continuous lengths of timber which are finally cut to required length for commercial sale.

The practice described is successfully used in many areas and has the advantage of producing long lengths of high grade timber from mixed lengths of low grade timber.

This conventional finger-jointing process described above requires seasoned timber i.e. dried to moisture content below fibre saturation point before joining and preferably at around 12% moisture content, to achieve the required strength and reliability. The timber may be seasoned by air drying, or by a drying process such as kiln drying. Air drying is suitable in some situations but the time involved being many weeks precludes its use in favor of a drying process such as kiln drying in many cases. By comparison with seasoned timber, unseasoned timber (i.e. fleshly cut wood from logs or partially dried after cutting) can have a moisture content of from 30% up to 200% on an oven dry basis. It is desirable to avoid the necessity of drying wood before jointing. When long lengths of wood are dried it includes all defects which will be subsequently cut from the long lengths and be discarded. It is often the practice for producers of finger-jointed material, for example, to buy low grade, unseasoned, wood and kiln dry it before manufacture. The proportion of defects in low grade timber can be high and in defect removal the wastage factor can exceed 50%, effectively doubling the cost of the dry timber before jointing. It is impractical to remove defects before drying because it would then be necessary to kiln dry short lengths of defect free timber under mechanical restraint.

Thus, before finger-jointing, in the production of conventionally finger-jointed timber, the lengths of timber after sawing from the log are kiln-dried or air-dried, and then sections containing defects such as knots etc. are cut from the lengths of timber leaving short lengths of high grade, dry timber. These short lengths of high grade timber are then finger-jointed to produce continuous lengths of timber which are finally cut to required length for commercial sale.

With other techniques for joining pieces of wood it would be deskable to glue the wood when in the unseasoned state. For example, in the manufacture of plywood the wood veneers are generally dried before being bonded together, and in the joining of pieces of wood to form longer or larger pieces with joint types other than finger-joints, such as by lamination for example, it may also be desirable to be able to glue the pieces together before drying, to reduce handling of the wood for example.

Seasoned timber is required for finger-jointing and other applications because the adhesives most often used are soluble in water. Free water present in the cell lumens of unseasoned timber can flow into the newly made joint, mix with the as yet uncured adhesive, and the adhesive can then dissolve into the water and migrate away from the joint. By the time the adhesive has cured naturally, the joint is lacking in adhesive and has insufficient adhesive present and a very weak joint results.

OBJECTS AND SUMMARY OF THE INVENTION

It is an object of this invention to provide an improved or at least alternative method for adhering together pieces of unseasoned wood.

In accordance with this and other objects evident from the following description of a preferred embodiment of the invention, a method of joining pieces of unseasoned wood comprises the steps of joining the pieces of wood with an adhesive formulation of a sufficiently high molecular weight or viscosity to avoid adhesive degradation or migration in situ in the joint by moisture from the wood during forming and curing of the joint, or which will cure to achieve a sufficiently high molecular weight or viscosity in a time sufficient to avoid adhesive degradation or migration in situ by moisture from the wood during forming and curing of the joint.

Preferably, the adhesive is cured without application of heat.

DETAILED DESCRIPTION OF A PREFERRED EMBODIMENT

In broad terms the invention may be said to comprise a method for joining pieces of unseasoned wood comprising joining the pieces of wood with an adhesive formulation of a sufficiently high molecular weight or viscosity to avoid adhesive degradation or migration in situ in the joint by moisture from the wood during forming and curing of the joint, or to achieve a sufficiently high molecular weight or viscosity which will cure in a time sufficient to avoid adhesive degradation or migration in situ moisture from the wood during forming and curing of the joint.

Where the pieces of wood are joined by finger-jointing the method includes removing defect material from longer lengths of wood containing defects to produce shorter lengths of higher grade, unseasoned timber and then finger-jointing the shorter lengths of unseasoned timber with the adhesive and curing the adhesive, preferably without the application of heat.

Where a high molecular weight or viscosity adhesive is employed it may be produced by aging an adhesive formulation of conventional viscosity and/or molecular weight so that preferably less than 50% of the normal pot life of the adhesive remains. Adhesives suitable after aging that may be employed are any adhesive formulations that will age to the required viscosity and molecular weight including formaldehyde based adhesives such as resorcinol formaldehyde, phenol formaldehyde, and urea formaldehyde. Additional hardener or accelerant or other additives, such as ammonium chloride and boric acid for example, may be added to the adhesive formulation to accelerate aging. Preferably a retardant is added to reduce the rate of aging, that is to increase the subsequent pot life of the adhesive, once the adhesive formulation has aged to the required viscosity and/or molecular weight for use in the method of the invention.

The adhesive may have a viscosity in the range of 7000 to 10,000 centipoise. However, adhesives having a viscosity outside this range may be employed. The adhesive may have a lower viscosity but the adhesive should have a sufficiently high viscosity to reduce the solubility and prevent migration away from the joint due to the presence of moisture. The viscosity of the adhesive may be higher provided that the viscosity of the adhesive is not so high that the adhesive may not be properly coated on the wood fingers.

Preferably where a high molecular weight and/or viscosity adhesive is employed which has not been produced by aging a lower molecular weight and/or viscosity adhesive formulation, an adhesive formulation having a base polymer which is highly branched or high molecular weight linear polymer is employed. These types of polymer are generally desolubilized on dilution with water. Suitable examples that may be mentioned are melamine urea formaldehyde in particular and resorcinol formaldehyde that have added a branching agent such as urea or melamine.

Preferably the adhesive employed is a formaldehyde based adhesive. Preferably in one case the formaldehyde based adhesive comprises at least one hydroxy or amino functionalized aromatic component. Examples of such components include phenol, aniline, resorcinol, catechol, phloroglucinol, tannin, and flavonoid compounds, and the like.

Preferably in another case the formaldehyde based adhesive comprises amino formaldehyde condensate. Examples of such adhesives include urea formaldehyde, melamine formaldehyde and casein formaldehyde.

Particular examples of adhesives are formulations comprising resorcinol formaldehyde, phenol formaldehyde, phenol resorcinol formaldehyde, urea formaldehyde, phenol urea formaldehyde, tannin formaldehyde, melamine formaldehyde or melamine urea formaldehyde. Phenolic adhesives are preferred and most preferred are resorcinol formaldehyde and phenol resorcinol formaldehyde.

The adhesive may be applied by any conventional technique for adhesive application in finger-jointing or other wood joining techniques, at usual application rates.

Whether the adhesive formulation is a high viscosity molecular weight formulation or not, preferably the adhesive is contacted with a cure promotor chemical which increases the rate of cure of the adhesive on forming of the joint. Preferably the cure promotor chemical is applied to wet one or both of the bonding surfaces of the wood, such as the fingers in a finger-joint, prior to application of the adhesive.

It is known in the art that adhesives can be formulated in two parts which are brought together when the adhesive is to be used or cured. For example, an adhesive system can comprise a reactive component kept prior to use at a pH suitable for minimum curing, and a second adhesive component compatible with the first part and which when contacted therewith in use renders the combination highly reactive towards adhesive curing. It is known that the adhesive curing rate is dependent on pH. Because of adhesive pot-life considerations, the pH range is normally held from approximately pH 1 to 8, in particular for fast curing adhesive formulations. The formulation of a two-part adhesive is an undesirable complication, and we have found that application of a simple pre-treatment chemical to one (or optionally both) of the bonding surfaces will achieve the same result as when using a formulated two-part adhesive system.

Alternatively however, the cure promotor chemical could be contacted with the adhesive by being injected or added into the adhesive supply line immediately before application of the adhesive to the wood, in a finger-jointing or plywood manufacture plant for example.

One class of preferred cure promotor chemical is basic chemicals (pH>7) which will react on contact with the adhesive to change the nature of a conventional adhesive to a fast curing adhesive.

One class of preferred cure promotor chemicals comprises ammonia or an amine or amine derivative compound. Preferably the ammonia or amine or amine derivative is applied in solution at least 10% by weight, but ammonia could be applied as a gas to the wood surfaces as it will solubilize on contact with wood moisture.

Another class of preferred cure promotor chemicals is organic acids such as low molecular weight carboxylic acids i.e. carboxylic acids having a molecular weight below 300 and most preferably below 150, applied in solution of at least 50% by weight and preferably at least 80% or above by weigh, including formic acid and trichloroacetic acid. In common usage it is undesirable to contact wood with strong acids as these can cause degradation of the wood material. We have found that certain acidic pre-treatment chemicals can be used effectively at the high concentrations, to achieve rapid curing.

Another class of preferred cure promotor chemicals is Lewis and Bronsted acids, preferably comprising a transition metal ion component such as chromium applied as chromic acid, zincs salts, aluminum salts, and the like. A further class of cure promotor chemical is volatile organic acids applied at high concentrations such as 90% formic acid, trifluoroacetic acid, and the like.

After application of the cure promotor chemical and most preferably where the cure promotor is an acid such as chromic acid Cr (V1), the bonding surfaces of the wood may be surface dried. By "surface dried" in the context of this invention is meant that the mating surfaces of the wood are heated without heating the body of the pieces of wood. For example in the case of finger-jointing where surface drying is employed the surface of the fingers are heated without treating of the body of the wood beyond the fingers. Surface heating for a time in the range of 30 to 120 seconds is preferred, by blowing hot air over the wood surfaces, for example.

After jointing, the joined pieces of wood may then be dried, for example, by artificial drying or simply by air seasoning. For example, after defect removal and finger-jointing of the timber with the method of the invention, the unseasoned finger-jointed lengths of timber may then be kiln dried.

Wood with a moisture content that would conventionally be regarded as too high for successful jointing by gluing or adhesion can be bonded before drying by the method of the invention. By unseasoned wood is meant wood having a moisture content in excess of 30%. Particularly preferred is wood having a moisture content in excess of the fibre saturation point of the wood i.e. at the fibre saturation point the cell walls are saturated with water and moisture is present around the larger fibers of the wood. The method can be used with wood having a moisture content in excess of 50 or even 100%.

With finger-jointing or other processes wherein defects are removed from lower grade timber and the remaining wood is jointed to form larger pieces, the method of the invention enables defects to be removed from the green timber before further processing so that defect wood is not further processed. In the case of drying for example, energy is not wasted in drying defect material. The method of the invention also makes available to unseasoned timber products such as framing the benefits of upgrading by finger-jointing. For wood which does not require defect removal such as veneers which are cut from logs to form plywood, the process enables the veneers to be bonded together immediately after cutting while still in the green state, so that it is not necessary to season and then bond the veneers so that handling is reduced.

The method of the invention is further illustrated by the following examples:

EXAMPLE 1

Ten finger-jointed samples were made up by cutting the separate pieces of the unseasoned stock having a mean moisture content of 90% by weight to 335 mm lengths, machining finger profiles on one end of each length using Leitz 10/10 mini joint cutters in a Louis Eichmann finger-jointing machine with automatic damping of samples and passage of the sample past the rotating cutting heads. A batch of resorcinol formaldehyde resin was mixed up using standard formulation (4 resin:1 hardener by weight). Viscosity was measured using a Brookfield viscometer and found to be between 3000 and 4000 centipoise at 20° C. A period of time was allowed to pass until further tests showed viscosity had reached 7000 centipoise. This adhesive was then applied to one set fingers and the set of fingers with adhesive thereon were mated to another set of fingers with no adhesive. Clamping forces parallel to the grain direction were applied to the plain ends of the now joined lengths of timber, at a stress of 5.5 MPa, by pressing between the platens of a universal testing machine.

The samples were dried at ambient temperature for a period of approximately 6 days and then conventionally kiln dried at 70° C. until the samples were at approximately 12% moisture content.

The samples were tested in bending, on the flat, (i.e. minor dimension as the specimen depth), over a span of 600 mm, with load heads located 200 mm apart centered on midspan. The results showed that a mean bending strength (Modulus of Rupture MOR) of 62.3 Mpa was obtained with a standard deviation of 11.1 Mpa at a means moisture content at assembly of 90%. Calculations according to New Zealand Standard 3616:1978 would assign these finger-joints an allowable bending stress of 13.3 MPa.

EXAMPLE 2

Sixteen finger-jointed samples were made up as in Example 1 from stock at 92% by weight means moisture content.

The freshly cut fingers on one piece from each joint were dipped in a solution of ammonium hydroxide (specific gravity 0.880). Freshly mixed R15 resorcinol formaldehyde adhesive was applied to the other set of fingers and the set of fingers with adhesive thereon were mated to the set of fingers which had been dipped in ammonium hydroxide. Clamping forces parallel to the grain direction were applied to the plain ends of the now jointed lengths of timber, at a stress of 5.5 MPa, by pressing between the platens of a universal testing machine.

The samples were dried in the laboratory at ambient temperature for a period of approximately 6 days then dried in a conventional kiln at 70° C. for 6 days until the samples were at approximately 12% moisture content.

The samples were tested in bending, on the flat (i.e. minor dimension as the specimen depth), over a span of 600 mm, with load heads located 200 mm apart centered on midspan. The results showed that a mean bending strength (Modulus of Rupture MOR) of 67.8 MPa was obtained with a standard deviation of 5.7 MPa. Calculations according to New Zealand Standard 3616:1978 would assign these finger-joints an allowable bending stress of 19.1 MPa.

EXAMPLE 3

Sixteen finger-jointed samples were made up as in Example 2 from stock at 149% by weight mean moisture content.

The freshly cut fingers on one piece from each joint were dipped in a solution of 5 molar triethanolamine. Freshly mixed R15 resorcinol formaldehyde adhesive was applied to the other set of fingers and the set of fingers with adhesive thereon were mated to the set of fingers which had been dipped in triethanolamine. The samples were clamped, subsequently dried and tested as in Example 2.

The results showed that a mean bending strength (Modulus of Rupture MOR) of 59.7 MPa was obtained with a standard deviation of 3.97 MPa.

EXAMPLE 4

Twenty finger-jointed samples were made up as in Example 1 from stock having a mean moisture content of 78%. A solution of 5% chromic (V1) acid was sprayed onto the freshly cut surfaces of the fingers on each piece, then the fingers were flash dried, using a hot air gun for 30 seconds per piece, so that the tips of the fingers reached about 100° C., the base of the fingers reached about 50° C., but solid wood 1 cm in from the base of the fingers did not change in temperature appreciably from the ambient temperature of 20° C. There was no significant drop in moisture content of the fingers. Freshly mixed R15 resorcinol formaldehyde adhesive was applied to one set of fingers and the set of fingers with adhesive thereon were mated to another set of fingers with no adhesive. Clamping forces parallel to the grain direction were applied to the plain ends of the now joined lengths of timber, at a stress of 5.5 MPa, by pressing between the platens of a universal testing machine.

The samples were dried in a force air dryer at ambient temperature for a period of approximately 4 weeks until the samples were at approximately 12% moisture content.

The samples were tested in bending, on the flat (i.e. minor dimension as the specimen depth), over a span of 600 mm, with load heads located 200 mm apart centered on midspan. The results showed that a mean bending strength (Modulus of Rupture MOR) of 61.6 MPa was obtained with a standard deviation of 12.2 MPa %. Calculations according to new Zealand Standard 3616:1978 would assign these finger-joints an allowable bending stress of 13.1 MPa.

EXAMPLE 5

Five pairs of slips were made from unseasoned (moisture saturated) radiata pine, otherwise complying with the requirements of British Standard 1204:Part 2. The bonding surface of one pine slip in each pair was dipped in a solution of ammonium hydroxide (specific gravity 0.880). Freshly mixed resorcinol formaldehyde adhesive was applied to the bonding surface of the other pine slip of each pair and the two pine slips were mated. clamping forces were applied to these pine slips according to British Standard 1204:Part 2. The samples were conditioned for five days in a conditioning cabinet operating at 25° C., and 65% R.H. The samples were tested in shear according to British Standard 1204:Part 2. The results showed a mean failure shear force of 1.9 kN with a maximum of 2.0 kN, and a minimum of 1.9 kN.

EXAMPLE 6

One pair of slips was made from unseasoned (moisture saturated) radiata pine, otherwise complying with the requirements of British Standard 1204:Part 2. The bonding surface of one pine slip was dipped in a solution of triethanolamine (5 molar). Freshly mixed phenol resorcinol formaldehyde adhesive was applied to the bonding surface of the other pine slip and the two pine slips were mated. The samples were clamped, subsequently dried and tested as in Example 6. The results showed a failure shear force of 1.8 kN.

EXAMPLE 7

Three pairs of slips were made from unseasoned (moisture saturated) radiata pine, otherwise complying with the requirements of British Standard 1204:Part 2. The bonding surface of one pine slip of each pair was dipped in a solution of tetramethyl ammonium hydroxide (5 molar). Freshly mixed resorcinol formaldehyde adhesive was applied to the bonding surface of the other pine slip of each pair and the two pine slips were mated. The samples were clamped, subsequently dried and tested as in Example 6. The results showed a mean failure shear force of 1.9 kN with a maximum of 2.1 kN, and a minimum of 1.7 kN.

EXAMPLE 8

Ten finger-jointed samples were made up as in Example 1 using stock at a mean moisture content of 107%. A solution of 0.5 mole/liter sodium periodate was sprayed onto the freshly cut surface of the fingers of each piece. Freshly mixed R15 resorcinol formaldehyde adhesive was applied to one set of fingers and the set of fingers with adhesive thereon were mated to another set of fingers with no adhesive. Clamping forces parallel to the grain direction were applied to the plain ends of the now joined lengths of the timber, at a stress of 5.5 MPa, by pressing between the platens of a universal testing machine.

The samples were dried in a forced air drier at ambient temperature for a period of approximately 4 weeks until the samples were at approximately 12% moisture content.

The samples were tested in bending, on the flat (i.e. minor dimension as the specimen depth), over a span of 600 mm, with load heads located 200 mm apart centered on midspan. The results showed that a mean bending strength (Modulus of Rupture MOR) of 47.3 MPa was obtained with a standard deviation of 7.2 Mpa. Calculations according to New Zealand Standard 3616:1978 would assign these finger-joints an allowable bending stress of 10.9 MPa.

EXAMPLE 9

Ten finger-jointed samples were made up as in Example 1 using unseasoned (moisture saturated) radiata pine. A solution of 90% foric acid was sprayed onto the freshly cut surface of the fingers of each piece. Freshly mixed urea formaldehyde adhesive was applied to one set of fingers and the set of fingers with adhesive thereon were mated on another set of fingers with not adhesive. Clamping forces parallel to the grain direction were applied to the plain ends of the now joined lengths of timber, at a stress of 5.5 MPa, by pressing between the platens of a universal testing machine.

The samples were dried in a forced air drier at ambient temperature for a period of approximately 4 weeks until the samples were at approximately 12% moisture content.

The samples were tested in bending, on the flat (i.e. minor dimension as the specimen depth), over a span of 600 mm, with load heads located 200 mm apart centered on midspan. The results showed that a mean bending strength (Modulus of Rupture MOR) of 47.3 MPa was obtained with a standard deviation of 7.2 MPa. Calculations according to New Zealand Standard 3616:1978 would assign these finger-joints an allowable bending stress of 10.9 MPa.

COMPARATIVE EXAMPLE 1

Unseasoned Wood

From a random sample of sawn anti-sapstain dipped, unseasoned 100×50 mm radiata pine timber twenty finger-jointed 650 mm lengths were manufactured by cutting the separate pieces of the unseasoned stock to 335 mm lengths, and machining finger profiles on one end of each length using Leitz 10/10 mini joint cutters in a Louis Eichmann finger-jointing machine with automatic clamping of samples and passage of the sample past the rotating cutting heads. Freshly mixed resorcinol formaldehyde adhesive was applied to one set of fingers and the set of fingers with adhesive thereon were mated to another set of fingers with no adhesive and clamping forces parallel to the grain direction were applied to the plain ends of the now joined lengths of timber, at a stress of 5.5 MPa, by pressing between the platens of a universal testing machine.

The samples were dried in a forced air drier at ambient temperature for a period of approximately 4 weeks until the samples were at approximately 12% moisture content.

The samples were tested in bending, on the flat (i.e. minor dimension as the specimen depth), over a span of 600 mm, with load heads located 200 mm apart centered on midspan. The results showed that a mean bending strength (Modulus of Rupture MOR) of 38.9 MPa was obtained with a standard deviation of 17.3 MPa at a mean moisture content at assembly of 101%. Calculations according to New Zealand Standard 3616:1978 would assign these finger-joints an allowable bending stress of 2.5 MPa.

COMPARATIVE EXAMPLE B

Seasoned Wood

As an example of the strengths obtained using the usual process on seasoned timber finger-jointed test samples were made using the above method except that this time the timber had first been seasoned to a moisture content of approximately 15%.

The results showed that a mean bending strength (Modulus of Rupture MOR) of 55.8 Mpa was obtained with a standard deviation of 9.9 Mpa at a mean moisture content at assembly of 15.8%. Calculations according to New Zealand Standard 3616:1978 would assign these finger-joints an allowable bending stress of 12.6 MPa.

The foregoing describes the invention including preferred forms and examples thereof. Alterations and variations to the method of the invention as will be apparent to those skilled in the art are intended to be incorporated in the scope hereof and it is understood that substitutions may be made and equivalents employed herein without departing from the scope of the invention, as defined in the following claims.

What is claimed is:

1. A method of joining pieces of unseasoned wood, comprising the steps of applying to the mating surface of at least one of the unseasoned pieces of wood a cure promoter selected from the group consisting of a solution of ammonia, a solution of an amine compound, a solution of an amine derivative compound, chromic acid and sodium periodate, applying a formaldehyde based adhesive to the mating surface of at least one of the pieces of wood, bringing the mating surfaces of the pieces of wood together to form the joint, and allowing the adhesive to cure.

2. A method as claimed in claim 1, wherein the adhesive comprises an amino formaldehyde condensate adhesive.

3. A method as claimed in claim 2, wherein the adhesive also includes at least one hydroxy or amino functionalised aromatic component.

4. A method as claimed in claim 3, wherein said component is selected from the group consisting of phenol, aniline, resorcinol, catechol, phloroglucinol, tannin, and flavonoid components.

5. A method as claimed in claim 1, wherein the adhesive is selected from the group consisting of resorcinol formaldehyde, phenol formaldehyde, phenol resorcinol formaldehyde, phenol urea formaldehyde and tannin formaldehyde.

6. A method as claimed in claim 5, wherein, said ammonia in solution is an at least 10% by weight ammonia solution.

7. A method as claimed in claim 1 or claim 6, wherein is included the step of applying the cure promoter to one mating surface and applying the adhesive separately to the opposite mating surface.

8. A method as claimed in claim 1, wherein the moisture content of the wood is at or in excess of the fibre saturation point of the wood.

9. A method as claimed in claim 1, wherein the moisture content of the wood is in excess of 9%.

10. A method as claimed in claim 1, wherein the moisture content of the wood is in excess of 100%.

11. A method as claimed in claim 1 or claim 6, wherein is included the step of curing the adhesive without application of heat.

12. A method as claimed in claim 1 or claim 6, wherein is included the step of joining the pieces of wood by finger jointing.

13. A method as claimed in claim 1 or claim 6, wherein is included the step of removing defects from longer lengths of wood to obtain the pieces of wood to be joined.

* * * * *